United States Patent
Hoeger (10) Patent No.: US 12,059,759 B2
(45) Date of Patent: Aug. 13, 2024

(54) HARMONIC METAL MANUFACTURING WIRE RECIPROCATION

(71) Applicant: ILLINOIS TOOL WORKS INC., Glenview, IL (US)

(72) Inventor: Michael V. Hoeger, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 442 days.

(21) Appl. No.: 16/936,044

(22) Filed: Jul. 22, 2020

(65) Prior Publication Data

US 2021/0053138 A1 Feb. 25, 2021

Related U.S. Application Data (60) Provisional application No. 62/890,256, filed on Aug. 22, 2019.

(51) Int. Cl.
 *B23K 9/30* (2006.01)
 *B23K 9/12* (2006.01)
 *B23K 9/133* (2006.01)

(52) U.S. Cl.
 CPC .......... *B23K 9/30* (2013.01); *B23K 9/125* (2013.01); *B23K 9/1336* (2013.01)

(58) Field of Classification Search
 CPC . H02K 15/04; H02K 3/50; H02K 3/12; B23K 26/32; B23K 26/26; B23K 26/03; B23K 2101/36; B23K 2103/12; B23K 26/082; B23K 26/28; B23K 9/30; B23K 9/124; B23K 9/122; B23K 9/095; B23K 9/1336; B23K 9/173; B23K 9/133; B23K 9/125; B23K 9/0953; B65H 51/10; B65H 51/32; B65H 2701/36
 USPC ......................................... 219/121.64, 137.7
 See application file for complete search history.

(56) References Cited

U.S. PATENT DOCUMENTS

| | | | |
|---|---|---|---|
| 2003/0038154 A1 | 2/2003 | Toquet | |
| 2017/0050254 A1 | 2/2017 | Holverson | |
| 2017/0182580 A1* | 6/2017 | Hsu | ........................ B23K 9/133 |
| 2018/0178308 A1* | 6/2018 | Scotchmer | ............... B23K 9/04 |
| 2019/0099769 A1* | 4/2019 | Holverson | .............. B23K 9/122 |

FOREIGN PATENT DOCUMENTS

| | | |
|---|---|---|
| CN | 108188544 A | 6/2018 |
| DE | 102017213878 A1 | 2/2019 |
| JP | 2014231090 A | 12/2014 |
| JP | 2015142926 A | 8/2015 |

OTHER PUBLICATIONS

European Patent Office, Communication with European search report in application No. 20191256.6 dated Feb. 5, 2021 (9 pages).

* cited by examiner

*Primary Examiner* — Vy T Nguyen
(74) *Attorney, Agent, or Firm* — McAndrews, Held & Malloy, Ltd.

(57) ABSTRACT

A harmonic welding wire oscillator configured to oscillate a stretch of welding wire within a wire liner. The oscillator may include an actuator configured to oscillate the welding wire at a resonant frequency of the stretch of welding wire. The oscillation causes reciprocation of the welding wire at the tip of the welding torch.

20 Claims, 4 Drawing Sheets

HARMONIC METAL MANUFACTURING WIRE RECIPROCATION

CROSS REFERENCE TO RELATED APPLICATIONS

The present application claims the benefit of U.S. Provisional Patent Application Ser. No. 62/890,256 filed Aug. 22, 2019, entitled "Harmonic Metal Manufacturing Wire Reciprocation." The entire contents of U.S. Provisional Patent Application Ser. No. 62/890,256 are expressly incorporated herein by reference.

BACKGROUND

The present disclosure relates to welding-type devices and, more particularly, to a reciprocating wire feed system.

A number of conventional welding systems and conventional welding control regimes have been implemented for various purposes. In continuous welding processes with consumable electrode, gas metal arc welding (GMAW), and more specifically, metal inert gas (MIG) or metal active gas (MAG) techniques (collectively called GMAW) allow for formation of a continuing weld bead by feeding welding wire electrode shielded by gas (typically an inert gas or gas containing inert agents or active gas such as $CO_2$ or oxygen) from a welding torch.

SUMMARY

The present disclosure relates to a harmonic wire reciprocation system, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numerals are used to refer to similar or identical elements.

DETAILED DESCRIPTION

Some advanced forms of welding with consumable electrodes involve controlling duration, frequency, voltage, and/or current of short circuits between the wire electrode and the advancing weld puddle formed from melted metal of the workpieces and the wire electrode. One method of controlling short circuit behavior is welding current reduction during short-to-arc and arc-to-short transitions via current regulation or a secondary switch in the welding power supply.

In some welding systems, the controlled short circuits may be created by a reciprocating wire feed system configured to oscillate the welding wire into and out of contact with the advancing weld puddle. By oscillating the wire into and out of contact with the weld puddle, liquid at the end of the welding wire may be dipped into the puddle mechanically and detached form the welding wire when the wire is pulled out of the puddle, thereby accomplishing a "controlled short circuit" effect. Mechanical motion of the wire is slow for conventional wire reciprocation techniques, which limits the deposition capability and/or welding speed. To achieve desired higher deposition and faster welding travel speed, the wire moves bi-directionally in excess of 1000 inches per minute and at a rate in excess of 100 Hz at 100% duty cycle. Conventional reciprocating wire feed systems use a bi-directional motor, and bi-directional motors typically have high torque requirements to overcome the inertia of the motor, the drive rolls and/or gears. Bi-directional motors may have limitations on the reciprocating frequency (which in turn imposes limitation on wire feed and travel speeds and productivity), may be susceptible to overheating, and/or may be oversized, which may cause reduced weld joint accessibility at the torch.

U.S. Patent Application Publication No. 2017/0182580, by Christopher Hsu, Dennis Roland Sigl, and Herbert Alexius Bankstahl, entitled "Reciprocation Wire Feed Welding System and Method" discloses a reciprocating wire feed system that includes a wire-reciprocator within a wire feeder. The entirety of U.S. Patent Application Publication No. 2017/0182580 is hereby incorporated by reference. U.S. Patent Application Publication No. 2019/0099769, by Todd Earl Holverson and Christopher Hsu, entitled "Metal Manufacturing Systems and Methods Using Mechanical Oscillation" discloses a mechanical oscillation system configured to mechanically oscillate a welding tool. The entirety of U.S. Patent Application Publication No. 2019/0099769 is hereby incorporated by reference.

The present disclosure relates to oscillating the welding wire by using the welding wire as a spring and a force actuator mass as a harmonic resonator to reciprocate the welding wire at the tip of the welding torch. The present disclosure provides advantages as compared to conventional reciprocating wire feed systems (e.g., systems that utilize bi-directional motors), including increased reliability as well as smaller and/or lower-cost parts.

Disclosed example welding torches include a wire guide configured to guide welding wire fed from a wire feeder to a first end of the torch to deliver welding wire to a welding application, the wire guide defining a clearance zone within which the welding wire may oscillate when a force transverse to a travel path of the welding wire is applied to welding wire within the clearance zone; and an actuator configured to apply force in at least one direction to welding wire within the clearance zone at a first frequency to oscillate welding wire within the clearance zone.

Some example welding torches further include a linkage having an aperture through which the welding wire is routed, and the actuator is configured to apply force to the linkage to oscillate the welding wire within the clearance zone.

In some example welding torches, a mass of the linkage is adjustable.

In some example welding torches, the actuator is a coil configured to produce a magnetic field, and the linkage comprises a magnet.

In some example welding torches, a resonant oscillation frequency of welding wire within the clearance zone is at least 25 hertz.

In some example welding torches, the first frequency is a resonant oscillation frequency of the welding wire within the clearance zone.

In some example welding torches, the wire guide includes at least one sprag clutch along the length of the wire guide before the clearance zone, and the clutch allows welding wire to move in a forward direction towards the first end of the torch and restricts welding wire from moving in a backward direction away from the first end.

In some example welding torches, the oscillation of welding wire within the clearance zone is configured to cause the welding wire to provide a reciprocating movement at the first end of the torch at a frequency twice the first frequency.

In some example welding torches, the actuator is a motor configured to apply force directly to the welding wire within the clearance zone.

In some example welding torches, the clearance zone includes a guide configured to restrict movement of welding wire within the clearance zone to a single plane.

In some example welding torches, the wire guide includes a plurality of rollers, and the clearance zone includes a spacing between successive rollers.

In some example welding torches, the length of the clearance zone is adjustable by adjusting the spacing. In some example welding torches, the spacing is adjusted by adding or removing rollers.

Some example welding torches further include control circuitry configured to determine the first frequency based on the type of welding wire, the diameter of the welding wire, the length of the clearance zone as defined by the endpoints of the clearance zone, and a mass of material to be oscillated within the clearance zone, and to control the actuator based on the determined first frequency.

In some example welding torches, the control circuitry determines the frequency via determining a spring constant of the welding wire based on the type of welding wire, the diameter of the welding wire, and the length of the clearance zone.

In some example welding torches, the actuator is a rotary motor that drives a cam.

In some example welding torches, the determined first frequency is a resonant frequency of the welding wire within the clearance zone.

In some example welding torches, the wire guide includes a freewheeling guide wheel and a unidirectional guide wheel, and the clearance zone is between a first contact point between the freewheeling guide wheel and the welding wire and a second contact point between the unidirectional guide wheel and the welding wire.

In some example welding torches, the torch is a GMAW torch.

As used herein, the terms "welding-type power supply," "welding-type power source," and "welding-type system," refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding).

As used herein, the term welding-type output means an output signal that is suitable for welding, plasma cutting or induction heating.

As used herein, the term "torch" or "welding-type tool" can include a hand-held or robotic welding torch, gun, or other device used to create the welding arc.

As used herein, the term "welding mode" is the type of process or output used, such as CC, CV, pulse, MIG, TIG, spray, short circuit, etc.

Welding operation, as used herein, includes both actual welds (e.g., resulting in joining, such as welding or brazing) of two or more physical objects, an overlaying, texturing, and/or heat-treating of a physical object, and/or a cut of a physical object) and simulated or virtual welds (e.g., a visualization of a weld without a physical weld occurring).

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy. Electric power of the kind measured in watts as the product of voltage and current (e.g., V*I power) is referred to herein as "wattage."

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

The terms "control circuit" and "control circuitry," as used herein, may include digital and/or analog circuitry, discrete and/or integrated circuitry, microprocessors, digital signal processors (DSPs), and/or other logic circuitry, and/or associated software, hardware, and/or firmware. Control circuits may include memory and a processor to execute instructions stored in memory. Control circuits or control circuitry may be located on one or more circuit boards, that form part or all of a controller, and are used to control a welding process, a device such as a power source or wire feeder, motion, automation, monitoring, air filtration, displays, and/or any other type of welding-related system.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

Figure 1:
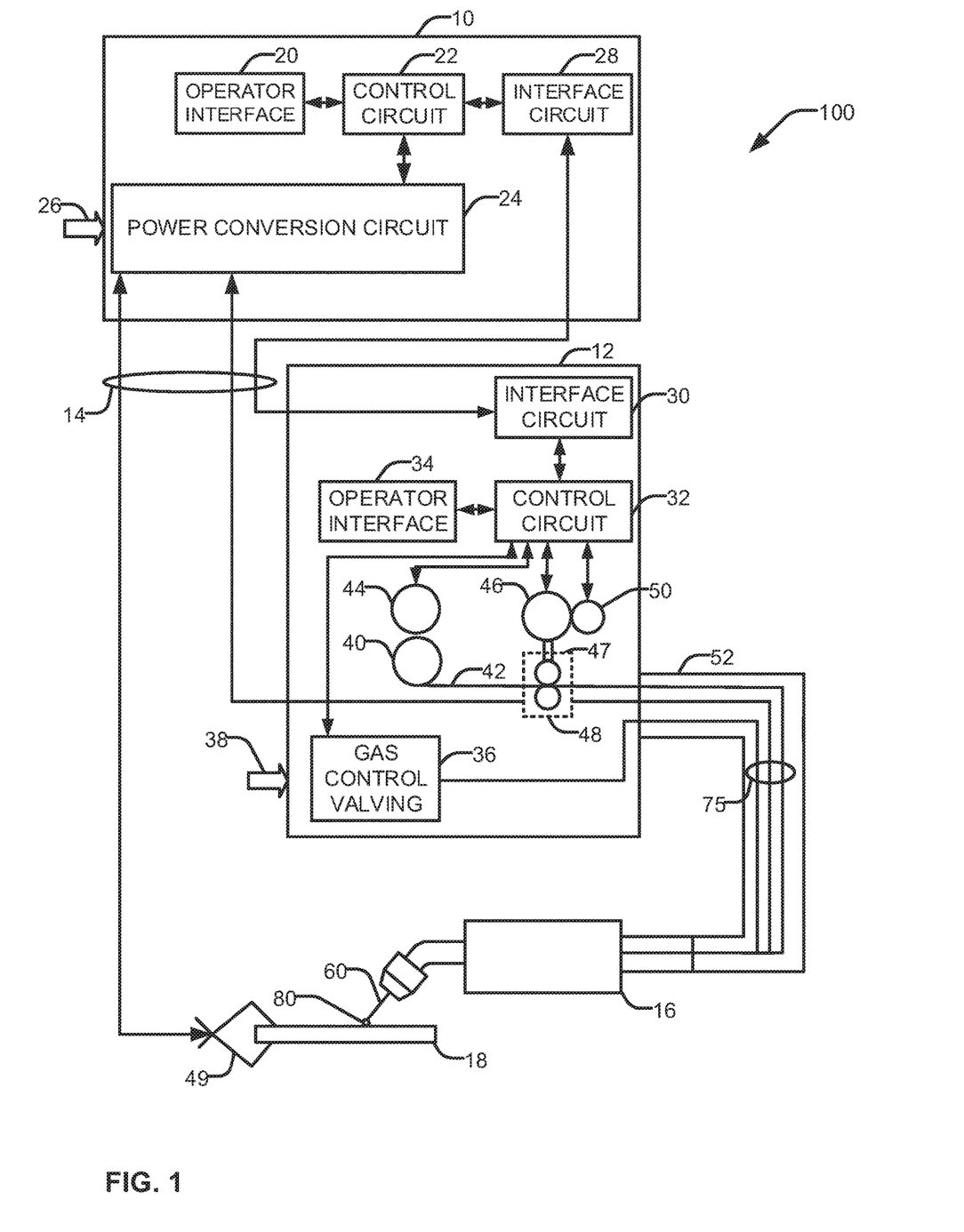
FIG. 1 is an illustration of an example welding-type system in accordance with aspects of this disclosure.

FIG. 1 illustrates an example arc welding system 100 for performing welding operations. As shown in the arc welding system of FIG. 1, a power supply 10 and a wire feeder 12 are coupled via conductors or conduits 14. In the illustrated example, the power supply 10 is separate from the wire feeder 12, such that the wire feeder may be positioned at some distance from the power supply near a welding location. However, in some examples the wire feeder may be integrated with the power supply 10. In such cases, the conduits 14 would be internal to the system. In examples in which the wire feeder 12 is separate from the power supply 10, terminals are typically provided on the power supply and on the wire feeder 12 to allow the conductors or conduits to be coupled to the systems so as to allow for power and gas to be provided to the wire feeder 12 from the power supply 10, and to allow data to be exchanged between the two devices.

The system is configured to provide wire, power and shielding gas to a welding torch 16. The torch 16 may be any type of arc welding torch, (e.g., GMAW, GTAW, FCAW, SAW) and may allow for the feed of a welding wire 42 (e.g., an electrode wire) and gas to a location adjacent to a workpiece 18. A second conductor is run to the welding workpiece 18 so as to complete an electrical circuit between the power supply 10 and the workpiece 18.

The welding system is configured for data settings to be selected by the operator and/or a welding sequence, such as via an operator interface 20 provided on the power supply 10. The operator interface 20 will typically be incorporated into a front faceplate of the power supply 10, and may allow for selection of settings such as the weld process, the type of wire to be used, voltage and current settings, and so forth. The system may be configured to allow for welding with various steels, aluminums, or other welding wire that is channeled through the torch 16. Further, the system may be configured to employ welding wires with a variety of cross-sectional geometries (e.g., circular, substantially flat, triangular, etc.). These weld settings are communicated to a control circuit 22 within the power supply 10. The system may be particularly adapted to implement welding regimes configured for certain electrode types.

The control circuit 22, described in greater detail below, operates to control generation of welding power output that is supplied to the welding wire 42 for carrying out the desired welding operation. In "short circuit" modes, droplets of molten material form on the welding wire 42 under the influence of heating by the welding arc, and these are periodically transferred to the workpiece 18 by contact or short circuits between the welding wire 42 and droplets 80 and the workpiece 18. In this manner, the system and/or the control circuit 22 controls creation of the weld of the workpiece 18 by adjusting one or more operational characteristics of the system during the welding process. The operational characteristics may include, but are not limited to, wire feeder speed, wire feeder direction, travel speed, power output, process mode, deposition path, deposition sequence, torch angle, etc.

Power from the power supply 10 is applied to the wire electrode 42, such as via a welding cable 52. Similarly, shielding gas is fed through the wire feeder 12 and the welding cable 52. During welding operations, the welding wire 42 is advanced through a jacket of the welding cable 52 towards the torch 16. A workpiece cable and clamp 49 allow for closing an electrical circuit from the power supply through the welding torch 16, the electrode (wire) 42, and the workpiece 18 for maintaining the welding arc during the operation.

The present arc welding system may allow for control of successive voltage and/or current levels and/or pulse durations based on previous current and duration measurements so as to control the promotion, occurrence, duration, and interruption of short circuit events between the welding wire electrode and the advancing weld puddle. In particular, current peaks in waveforms may be regulated based on one or more preceding short circuit events, or aspects of the short circuit events, such as its duration.

The control circuit 22 is coupled to power conversion circuit 24. This power conversion circuit 24 is adapted to create the output power, such as pulsed waveforms applied to the welding wire 42 at the torch 16. Various power conversion circuits may be employed, including choppers, boost circuitry, buck circuitry, inverters, converters, and so forth. The configuration of such circuitry may be of types generally known in the art in and of itself. The power conversion circuit 24 is coupled to a source of electrical power as indicated by arrow 26. The power applied to the power conversion circuit 24 may originate in the power grid, although other sources of power may also be used, such as power generated by an engine-driven generator, batteries, fuel cells or other alternative sources. The power supply 10 illustrated in FIG. 1 may also include an interface circuit 28 configured to allow the control circuit 22 to exchange signals with the wire feeder 12.

The wire feeder 12 includes a complimentary interface circuit 30 that is coupled to the interface circuit 28. In some examples, multi-pin interfaces may be provided on both components and a multi-conductor cable run between the interface circuit to allow for such information as wire feed speeds, processes, selected currents, voltages or power levels, and so forth to be set on either the power supply 10, the wire feeder 12, or both.

The wire feeder 12 also includes control circuit 32 coupled to the interface circuit 30. As described below, the control circuit 32 allows for wire feed speeds to be controlled in accordance with operator selections or stored or determined sequence instructions, and permits these settings to be fed back to the power supply via the interface circuit. The control circuit 32 is coupled to an operator interface 34 on the wire feeder that allows selection of one or more welding parameters, particularly wire feed speed. The operator interface may also allow for selection of such weld parameters as the process, the type of wire utilized (e.g., material and diameter), current, voltage or power settings, and so forth. The control circuit 32 may also be coupled to gas control valving 36 which regulates the flow of shielding gas to the torch. In general, such gas is provided at the time of welding, and may be turned on immediately preceding the weld and for a short time following the weld. The gas applied to the gas control valving 36 may be provided in the form of pressurized bottles, as represented by reference numeral 38.

The wire feeder 12 includes components for feeding wire to the welding torch 16 and thereby to the welding application, under the control of control circuit 32. For example, one or more spools of welding wire 40 are housed in the wire feeder 12. Welding wire 42 is unspooled from the spools and is progressively fed to the tool 16. The spool 40 may be associated with a clutch 44 that disengages the spool 40 when wire is to be fed to the torch 16. The clutch 44 may also be regulated to maintain a minimum friction level to avoid free spinning of the spool 40. The first wire feeder motor 46 may be provided within a housing 48 that engages with wire feed rollers 47 to push wire from the wire feeder 12 towards the torch 16.

In practice, at least one of the rollers 47 is mechanically coupled to the motor 46 and is rotated by the motor 46 to drive the wire 42 from the wire feeder 12, while the mating roller is biased towards the wire to maintain good contact between the two rollers and the wire 42. Some systems may include multiple rollers of this type. A tachometer 50 or other sensor may be provided for detecting the speed of the first wire feeder motor 46, the rollers 47, or any other associated component so as to provide an indication of the actual wire feed speed. Signals from the tachometer 50 are fed back to the control circuit 32, such as for continued or periodic monitoring, calibration, etc. In some examples, the system includes a wire spool motor for rotating the wire feeding device, which can be similarly adjusted to increase or decrease the amount of wire between wire feeder motors.

Other system arrangements and input schemes may also be implemented. For example, the welding wire may be fed from a bulk storage container (e.g., a drum) or from one or more spools outside of the wire feeder. Similarly, the wire may be fed from a "spool gun," in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

The torch 16 may include a wire oscillation system which oscillates welding wire 42 which causes wire at the tip 60 of the torch 16 to reciprocate at a controllable frequency.

Figure 2:
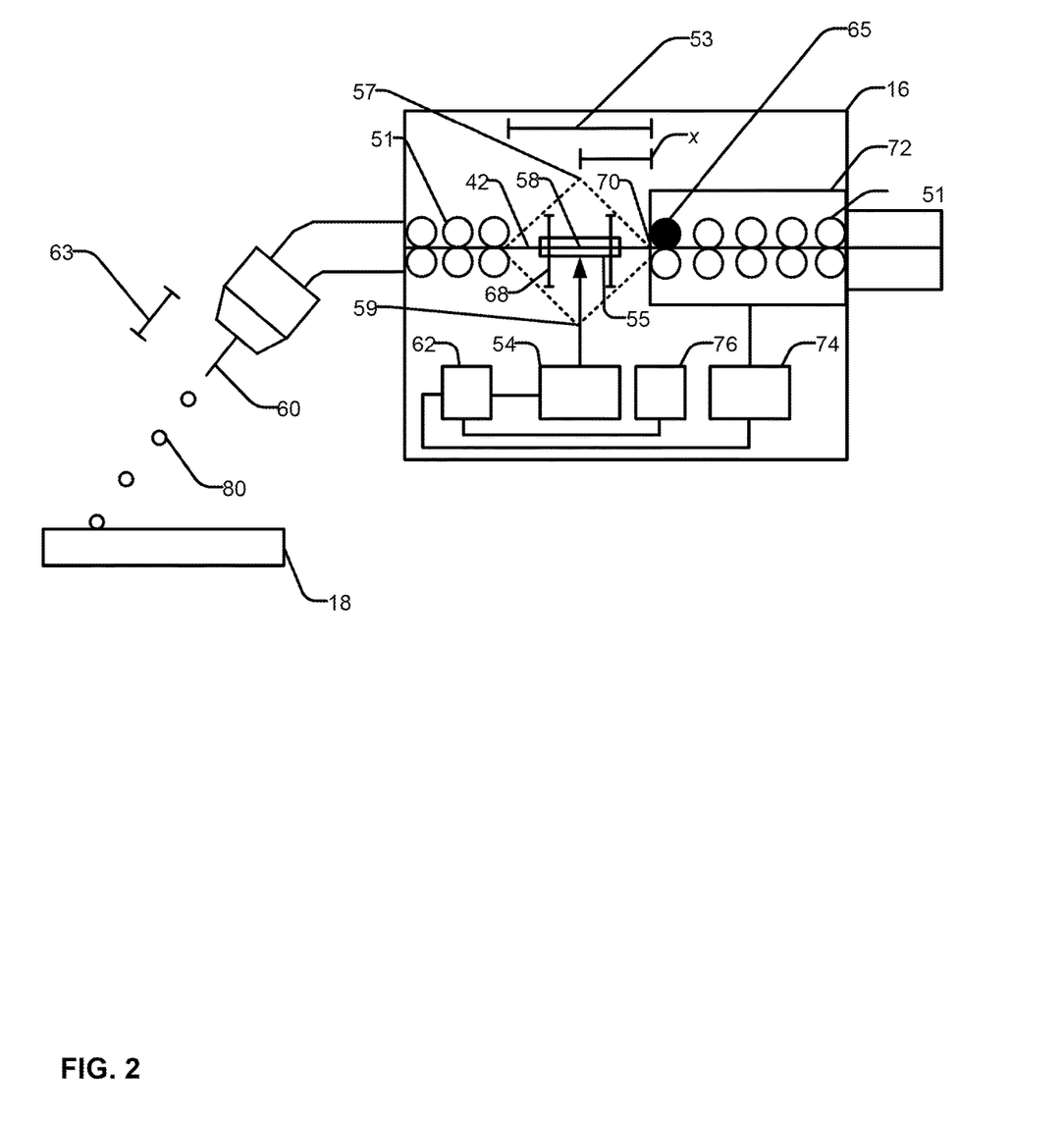
FIG. 2 is an illustration of an example welding torch including a wire reciprocation system.

FIG. 2 shows a diagram of an example welding torch, for example the welding torch 16 of FIG. 1, which includes a wire oscillation system. The torch 16 may include a wire liner which includes pins or rollers 51. A clearance zone 53 is formed in the liner in the torch 16 which is a space without pins 51. Within the torch 16, an actuator 54 applies force to the welding wire 42 within the clearance zone 53, for example via a linkage 55 through which the welding wire 42 is fed.

The example linkage 55 has an aperture through which welding wire 42 fed from the wire feeder 12 is run. The actuator 54 applies force to the linkage 55 in a direction transverse (e.g., perpendicular) to the direction of travel of the welding wire 42 through the linkage 55. The force causes the welding wire 42 to move in the direction of the force (e.g., to a position 57 away from the actuator 54). Because the welding wire 42 is secured at one end of the clearance zone 53 (e.g., via a freewheeling clutch 65 as described below), a tip 60 of the welding wire 42 is retracted when the welding wire 42 is displaced from a neutral position 58 toward the positions 57 and 59.

As the welding wire 42 is displaced, the welding wire 42 stores energy in the form of tension in response to the force applied by the actuator 54 and the linkage 55. When the force is relaxed and/or the tension in the welding wire 42 overcomes the force from the actuator 54, the welding wire 42 moves back past the original position 58 when force is not applied by the actuator 54. Accordingly, by periodically or continuously applying force in at least one direction, the actuator 54 may cause the welding wire 42 to oscillate.

The combination of the welding wire 42 and the linkage 55 has a natural, or resonant, frequency $\omega_o$ which is based on the system mass m (i.e., the mass of the welding wire 42 within the clearance zone and linkage 55) and the spring constant k. The spring constant k is based on the welding wire material and the length of the clearance zone 53.

$$\omega_o = \sqrt{\frac{k}{m}} \text{ and } \omega_0 = 2\pi f \text{ where } f \text{ is the frequency in hertz}$$

In some examples, the mass of the linkage 55 and the length of the clearance zone 53 are selected such that the natural frequency $f_n$ is at least 25 hertz. In some examples, the mass of the linkage 55 and the length of the clearance zone 53 are selected such that the natural frequency $f_n$ is at least 50 hertz. Reducing the length of the clearance zone 53 increases k and thus increases the natural frequency $f_n$. Similarly, increasing the length of the clearance zone 53 decreases k and thus decreases the natural frequency $f_n$. Oscillation of the welding wire 42 within the clearance zone 53 results in in reciprocation of the welding wire 42 at the tip 60 of the torch 16. Decreasing the system mass m (e.g., by decreasing the mass of the linkage 55) increases the frequency $f_n$ and increasing the mass m decreases the frequency $f_n$.

The reciprocation frequency $f_r$ is twice the oscillation frequency $f_n$ because the wire 42 at the tip 60 of the torch 16 reciprocates (i.e., is pulled back towards to torch 16 away from the workpiece 18) each time that the welding wire 42 moves away from the natural position 58 towards the displacement limit positions 57 and 59. The example displacement limit positions 57 and 59 may be the points of maximum oscillation amplitude, or the points where the oscillation motion changes direction. Accordingly, if the oscillation frequency f is 50 hertz, the reciprocation frequency is 100 hertz.

At least one of the pins of the wire liner is a one-way freewheeling clutch 65 which only allows movement of the wire in a forwards direction. For example, the freewheeling clutch 65 may be a sprag clutch. The freewheeling clutch 65 allows the welding wire 42 fed by the wire feeder 12 to move forwards towards the torch tip 60, but not backwards towards the wire feeder 12. The freewheeling clutch 65 prevents reciprocation attenuation by preventing the wire 42 from moving back towards the wire feeder 12.

In some examples, the length of the clearance zone 53 is adjustable by removing or adding rollers 51 to the wire liner. In some examples, the length of the clearance zone is adjustable by adjusting a spacing of a subset 72 of rollers 51 and 65. The subset 72 of rollers may be included in a carriage having an adjustable length. The spacing of the subset 72 of rollers is increased by increasing the width of the carriage. In some examples, the spacing of the subset 72 of rollers may be manually adjusted. In some examples, the spacing of the subset 72 of rollers may be electronically controlled. For example, the controller 62 may control an actuator 74 which adjusts the spacing of the subset 72 of rollers. An example actuator 74 may include a motor which drives a worm screw (i.e., a worm drive) which expands and retracts the spacing of the subset 72 of rollers. Adjusting the spacing of the subset of rollers correspondingly increases or decreases the length of the clearance zone 53, and, as a result, the resonance frequency of the welding wire 42.

The welding wire 42 at the torch tip 60 reciprocates, or retracts, a distance d 63. The distance d 63 is equal to 2(h-x). h is equal to the distance between the maximum point 57 and the point 70, where point 70 is the back end of the clearance zone (e.g., where the welding wire 42 contacts the sprag clutch 65). x is equal to the distance between the natural resting centerpoint 58 and the point 70. In other words x is equal to half of the length of the clearance zone 53.

In some examples, the actuator 54 is an electromagnet (e.g., a coil or a solenoid) which generates a magnetic field, and the linkage 55 is magnetic (e.g., a ferromagnet). A magnetic field generated by the electromagnet 54 pushes the magnet 55 towards the maximum point 57. In some examples, the electromagnet 54 may pull the magnet 55 towards the maximum point 59. In some examples, the electromagnet 54 generates magnetic fields at the resonant frequency $f_n$. For example, if the electromagnet 54 generates a magnetic field that causes the magnet 55 to feel a force in a direction away from the electromagnet 54, then the electromagnet 54 may be turned on for at least some duration during the time that the wire 42 moves from the position 59 to the position 57. The electromagnet 54 may then be turned off during the time that the wire 42 moves from position 57 to position 59. Accordingly, the electromagnet 54 is activated at the resonant frequency $f_n$.

A controller 62 may control the frequency of the actuation force generated by the actuator 54. In some examples, an operator may enter in the system parameters which determine the resonant frequency (mass, clearance zone, and wire type) to an interface (e.g., the interface 34 or 28) and the controller 62 controls the actuation frequency based on the input parameters. The controller 62 may communicate with the control circuit 32 of the wire feeder 12 and/or the control circuit 22 of the power supply 10. In some examples, the resonant frequency $f_n$ may be empirically determined for a given clearance zone length, mass m, and wire type (e.g., material and diameter). The controller 62 may then control the actuator 54 to apply force at an actuation frequency based on the empirically determined natural frequency $f_n$.

In some examples, the controller 62 may receive a desired reciprocation frequency, and control the actuator 74 to adjust the spacing of the subset 72 of rollers in order to achieve the clearance zone necessary to achieve the desired reciprocation frequency.

In some examples, the controller 62 runs tuning tests to determine the length of the clearance zone required to achieve the desired reciprocation frequency (i.e., the natural frequency of the combination of the welding wire 42 and the linkage 55 that will achieve the desired reciprocation frequency, where the reciprocation frequency is double the frequency of the combination of the welding wire 42 and the linkage 55). For example, the controller 62 may control the actuator 54 to apply a force to the welding wire 42 via the linkage 55 and then empirically determine the natural frequency of the combination of the welding wire 42 and the linkage 55 by counting oscillations of the system within a given time period.

The controller 62 may detect an oscillation (e.g., via a sensor 76). The sensor 76 may be any sensor that detects the movement of the welding wire 42 across a certain position. For example, the sensor 76 may be a light sensor, a Hall effect sensor, an inductive sensor, or the like. In some examples, where the actuator 54 is an electromagnet and the linkage 55 is a magnet, movement of the magnet induces current in the coils of the electromagnet 54. The controller 62 may detect voltages spikes induced in the coils by the movement of the magnet 55 caused by the oscillation of the welding wire 42.

If the determined natural frequency is less than the desired frequency, the controller 62 controls the actuator 74 to increase the spacing of the subset 72 of rollers. Increasing the spacing of the subset 72 of rollers decreases the length of the clearance zone 53, which increases the natural frequency of the combination of the welding wire 42 and the linkage 55.

Similarly, if the determined natural frequency is greater than the desired frequency, then the controller 62 controls the actuator 74 to decrease the spacing of the subset 72 of rollers. Decreasing the spacing of the subset 72 of rollers increases the length of the clearance zone 53, which decreases the natural frequency of the combination of the welding wire 42 and the linkage 55.

The controller 62 may iteratively run tests until the desired natural frequency is achieved. In some examples, the controller 62 may determine the natural frequency of the combination of the welding wire 42 and the linkage 55 and control the actuator 74 to adjust the spacing of the subset 72 of rollers in response to the determined natural frequency during a welding operation.

In some examples, oscillation motion of the wire 42 within the clearance zone is restricted to a plane which includes the points 57, 58, and 59. A guide 68, for example tracks, may only allow the linkage 55 to move up and down within the tracks, thereby restricting movement of the wire 42 to the plane which includes the points 57, 58, and 59.

In some examples the actuator 54 may be a motor which applies a mechanical force to the linkage 55 (e.g., the linkage 55 may be connected to a cam driven by a rotary motor). The linkage 55 may have a needle shape with the tip of the needle connected to the motor shaft and the welding wire 42 fed through the eye of the needle.

Although illustrated as part of the welding torch 16, in some examples, the oscillation system (including the linkage 55, the actuator 54, and the controller 62) may be included within the wire feeder 12.

Figure 3:
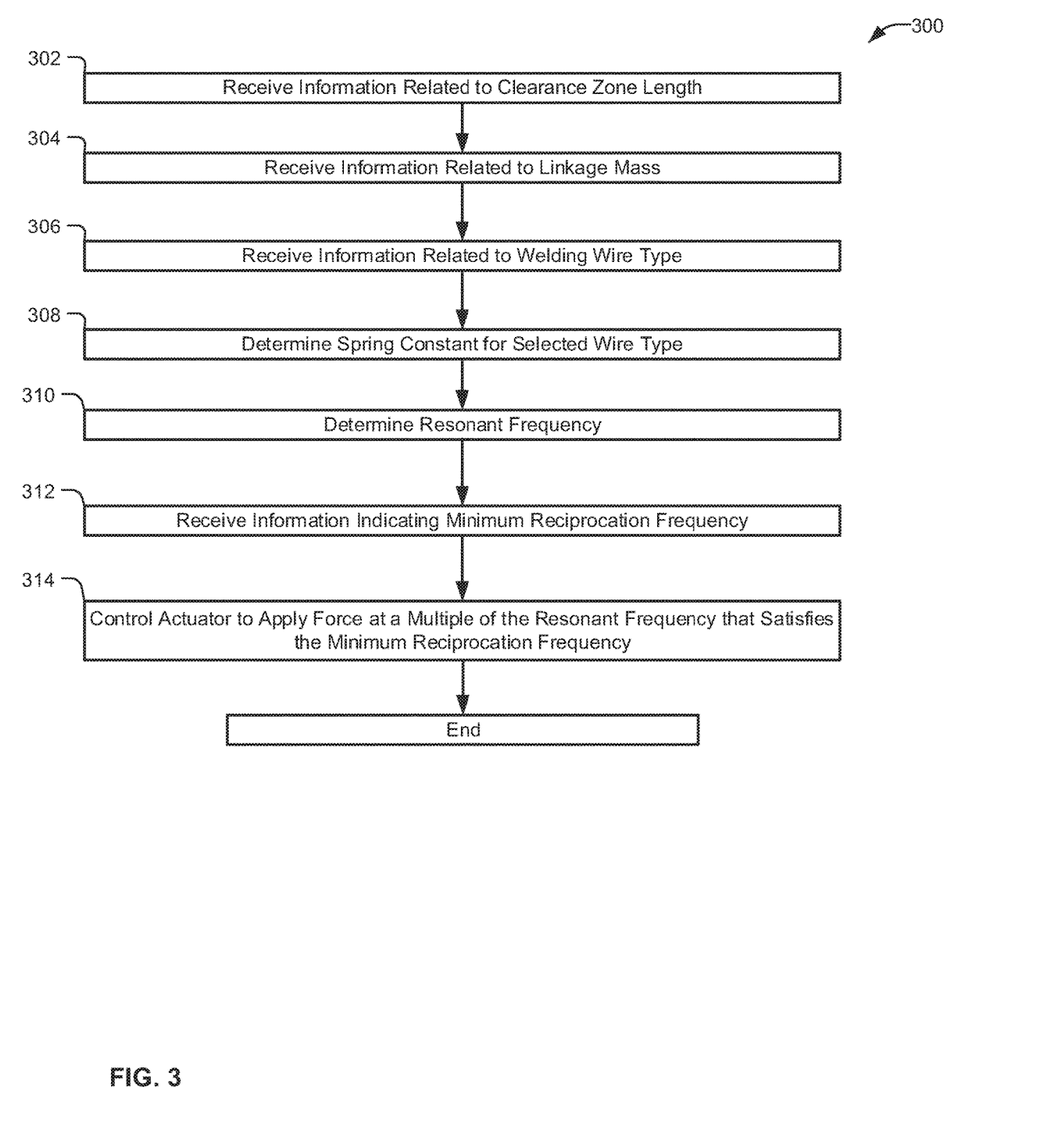
FIG. 3 is a flow chart of an example method of determining an oscillation frequency to apply to a wire reciprocation system in order to satisfy a desired reciprocation frequency.

FIG. 3 is a flow chart representative of example machine readable instructions 300 which may be executed by the system 100 of FIG. 1 to determine an oscillation frequency at which to apply force to a welding wire via an actuator. The machine readable instructions 300 may be partially or completely implemented by the controller 62 of FIG. 2.

At block 302, the controller 62 receives information related to the length of the clearance zone 53. The length of the clearance zone 53 may be determined by the number of installed rollers 51. The length of the clearance zone 53 is increased by removing rollers 53 and decreased by adding rollers 53. In some examples, an operator may input into an interface, for example the interface 20 of the power supply 10 or the interface 34 of the wire feeder 12, an indication of the length of the clearance zone 53 (for example based on the number of rollers 53 installed or removed from a baseline number of rollers). The information is then transmitted to the controller 62 via one or more cables 75. In some examples, the information may be transmitted over the welding cable 52.

At block 304, the controller 62 receives information related to the mass of the linkage 55. This information may be included in memory of the controller. In some examples, the mass is adjustable, and an operator may input into an interface, for example the interface 20 of the power supply 10 or the interface 34 of the wire feeder 12, an indication of the mass of the linkage 55. At block 306, the controller 62 receives information related to the welding wire 42 type (e.g., wire material type and diameter). This information may be sent to the controller 62 from the control circuit 22 of the power supply 10 or the control circuit 32 of the wire feeder 12, for example based on inputs received at the interface 20 or the interface 34.

At block 308, the controller 62 determines the spring constant k for the selected wire. The controller 62 may include a memory which includes a lookup table from which the controller 62 may look up the spring constant based on the determined welding wire type and the determined length of the clearance zone 53.

At block 310, the controller 62 determines the resonant frequency of the combination of the welding wire 42 and the linkage 55, where the resonant frequency $f_n$ is determined based on the formula below.

$$fn = \sqrt{\frac{k}{m}} \div 2\pi$$

At block 312, the controller 62 receives information indicating a minimum reciprocation frequency, which may be determined based on a selected welding process. The reciprocation frequency information may be sent to the controller 62 from the control circuit 22 of the power supply 10 or the control circuit 32 of the wire feeder 12.

At block 314, the controller 62 controls the actuator 54 to apply a force to the linkage 55 at a multiple of the resonant frequency $f_n$ that satisfies the minimum reciprocation frequency received at block 312. The reciprocation frequency is twice the oscillation frequency. For example, if the minimum reciprocation frequency is 100 Hz, and the determined resonant frequency is 60 Hz, then the controller 62 will control the actuator 54 to apply force at the first multiple of the resonant frequency (i.e., 60 Hz) so that the actual reciprocation frequency is 120 Hz, which is above 100 Hz. If the minimum reciprocation frequency is 100 Hz, and the determined resonant frequency is 35 Hz however, then the controller 62 will control the actuator 54 to apply a force at the second multiple of the resonant frequency, which would result in an actual reciprocation frequency of 140 Hz. If the controller controlled the actuator 54 to apply the force at the first multiple of the resonant frequency, then the actual reciprocation frequency would be 70 Hz, which would be below the minimum reciprocation frequency. Accordingly, the controller determines the lowest resonant frequency multiple that satisfies the minimum reciprocation frequency.

Figure 4:
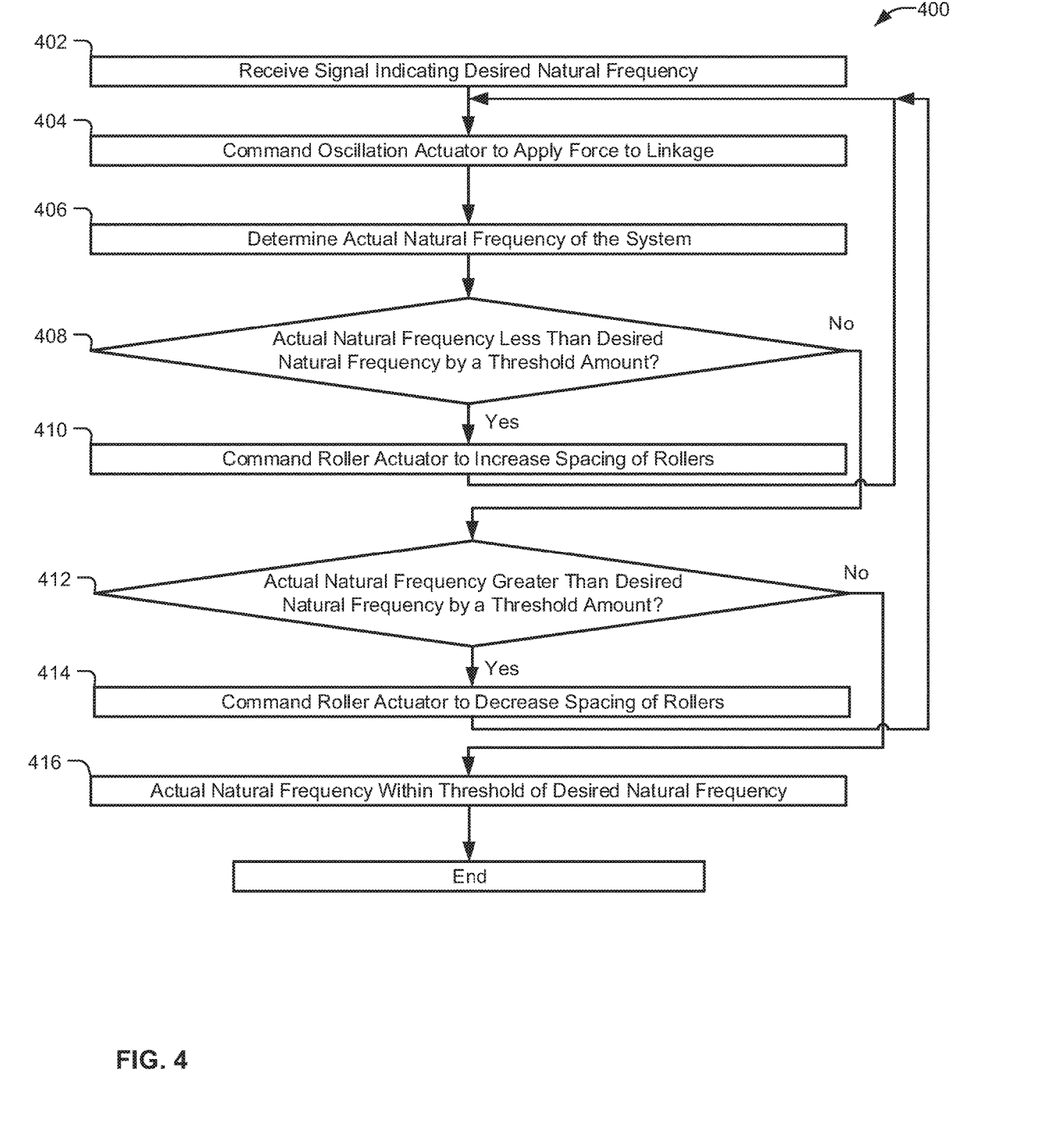
FIG. 4 is a flow chart of an example method to electronically tune the natural oscillation frequency of the reciprocation system.

FIG. 4 is a flow chart representative of example machine readable instructions 400 which may be executed by the system 100 of FIG. 1 to electronically adjust the length of the clearance zone 53 in order to tune the natural frequency of the combination of the welding wire 42 and the linkage 55. The machine readable instructions 400 may be partially or completely implemented by the controller 62 of FIG. 2.

At block 402, the controller 62 receives information indicating a desired reciprocation frequency, which may be determined, for example, based on a selected welding process. The reciprocation frequency information may be sent to the controller 62 from the control circuit 22 of the power supply 10 or the control circuit 32 of the wire feeder 12. The desired natural frequency is equal to half of the desired reciprocation frequency.

At block 404, the controller 62 commands the actuator 54 to apply a force to the linkage 55 in order to cause the combination of the welding wire 42 and the linkage 55 to oscillate within the clearance zone 53.

At block 406, the controller 62 determines the actual natural frequency of the combination of the welding wire 42 and the linkage 55. The controller 62 detects the number of oscillations of the combination of the welding wire 42 and the linkage 55 that occur within a given time period to determine the actual natural frequency.

At block 408, the controller 62 determines whether the actual natural frequency is less than desired natural frequency by a threshold amount (e.g., less by one percent, two percent, etc.). If the controller 62 determines that the actual natural frequency is less that the desired natural frequency by a threshold amount (block 408), then at block 410, the controller 62 commands the actuator 74 to increase the spacing of the subset 72 of rollers. Increasing the spacing of the subset 72 of rollers will decrease the length of the clearance zone 53, which will increase the natural frequency of the combination of the welding wire 42 and the linkage 55. In some examples, the amount by which the controller 62 commands the actuator 74 to increase the spacing is based on the magnitude of the difference between the actual natural frequency and the desired natural frequency. In other words, the controller may command the actuator to increase the spacing of the subset 72 of rollers in proportion to the magnitude of the difference between the actual natural frequency and the desired natural frequency. In some examples, the actuator may increase the spacing by a set distance at block 410. The controller 62 then returns to block 404 to repeat the testing process.

If the controller 62 determines that the actual natural frequency is not less that the desired natural frequency by a threshold amount (block 408), then at block 412, the controller 62 determines whether the actual natural frequency is greater than the desired natural frequency by a threshold amount (e.g., greater by one percent, two percent, etc.). If the controller 62 determines that the actual natural frequency is greater that the desired natural frequency by a threshold amount (block 412), then at block 414, the controller 62 commands the actuator 74 to decrease the spacing of the subset 72 of rollers. Decreasing the spacing of the subset 72 of rollers will increase the length of the clearance zone 53, which will decrease the natural frequency of the combination of the welding wire 42 and the linkage 55. In some examples, the amount by which the controller 62 commands the actuator 74 to decrease the spacing is based on the magnitude of the difference between the actual natural frequency and the desired natural frequency. In other words, the controller may command the actuator to decrease the spacing of the subset 72 of rollers in proportion to the magnitude of the difference between the actual natural frequency and the desired natural frequency. In some examples, the actuator may decrease the spacing by a set distance at block 414.

If the controller 62 determines that the actual natural frequency is not greater than the desired natural frequency by a threshold amount (block 412), then at block 416 the controller 62 determines that the spacing of the subset 72 of rollers does not need to be adjusted. In some examples, the controller 62 may send a signal, e.g., to the control circuit 22 of the welding power supply 10 or the control circuit 32 of the wire feeder 12 indicating that the reciprocation system is tuned for the desired reciprocation frequency.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed.

Instead, the present method and/or system will include all implementations falling within the scope of the appended claims, both literally and under the doctrine of equivalents.

What is claimed is:

1. A welding torch comprising:
   a wire guide configured to guide welding wire fed from a wire feeder to a first end of the torch to deliver welding wire to a welding application, the wire guide defining a clearance zone within which the welding wire oscillates when a force transverse to a travel path of the welding wire is applied to the welding wire within the clearance zone,
   wherein the wire guide comprises a plurality of rollers, the clearance zone comprises a spacing between successive rollers, and a length of the clearance zone is adjustable by adjusting the spacing by adding or removing rollers; and
   an actuator configured to apply the force to the welding wire in at least one direction transverse to the travel path of the welding wire within the clearance zone at a first frequency to oscillate welding wire within the clearance zone.

2. The welding torch of claim 1, further comprising a linkage having an aperture through which the welding wire is routed, wherein the actuator is configured to apply the force to the linkage to oscillate the welding wire within the clearance zone.

3. The welding torch of claim 2, wherein the first frequency is based at least in part on a mass of the linkage.

4. The welding torch of claim 2, wherein the actuator is a coil configured to produce a magnetic field, and wherein the linkage comprises a magnet.

5. The welding torch of claim 1, wherein a resonant oscillation frequency of welding wire within the clearance zone is at least 25 hertz.

6. The welding torch of claim 1, wherein the first frequency is a resonant oscillation frequency of the welding wire within the clearance zone.

7. The welding torch of claim 1, wherein the wire guide comprises at least one sprag clutch along the length of the wire guide before the clearance zone, wherein the clutch allows the welding wire to move in a forward direction towards the first end of the torch and restricts the welding wire from moving in a backward direction away from the first end.

8. The welding torch of claim 7, wherein oscillation of welding wire within the clearance zone is configured to cause the welding wire to provide a reciprocating movement at the first end of the torch at a frequency twice the first frequency.

9. The welding torch of claim 1, wherein the actuator is a motor configured to apply the force directly to the welding wire within the clearance zone.

10. The welding torch of claim 1, wherein the clearance zone comprises a guide configured to restrict movement of welding wire within the clearance zone to a single plane.

11. A welding torch comprising:
    a wire guide configured to guide welding wire fed from a wire feeder to a first end of the torch to deliver welding wire to a welding application, the wire guide defining a clearance zone within which the welding wire may oscillate when a force transverse to a travel path of the welding wire is applied to welding wire within the clearance zone;
    an actuator configured to apply the force in at least one direction to welding wire within the clearance zone at a first frequency to oscillate welding wire within the clearance zone; and
    control circuitry configured to determine the first frequency based on the type of welding wire, the diameter of the welding wire, a length of the clearance zone as defined by the endpoints of the clearance zone, and a mass of material to be oscillated within the clearance zone, and to control the actuator based on the determined first frequency.

12. The welding torch of claim 11, wherein the control circuitry determines the frequency via determining a spring constant of the welding wire based on the type of welding wire, the diameter of the welding wire, and the length of the clearance zone.

13. The welding torch of claim 11, wherein the determined first frequency is a resonant frequency of the welding wire within the clearance zone.

14. The welding torch of claim 1, wherein the actuator is a rotary motor that drives a cam.

15. A welding torch comprising:
    a wire guide configured to guide welding wire fed from a wire feeder to a first end of the torch to deliver welding wire to a welding application, the wire guide defining a clearance zone within which the welding wire may oscillate when a force transverse to a travel path of the welding wire is applied to welding wire within the clearance zone, wherein the wire guide comprises a freewheeling guide wheel and a unidirectional guide wheel, wherein the clearance zone is between a first contact point between the freewheeling guide wheel and the welding wire and a second contact point between the unidirectional guide wheel and the welding wire; and
    an actuator configured to apply the force in at least one direction to welding wire within the clearance zone at a first frequency to oscillate welding wire within the clearance zone.

16. The welding torch of claim 1, wherein the torch is a gas metal arc welding (GMAW) torch.

17. The welding torch of claim 15, further comprising a linkage having an aperture through which the welding wire is routed, wherein the actuator is configured to apply the force to the linkage to oscillate the welding wire within the clearance zone.

18. The welding torch of claim 15, wherein the first frequency is a resonant oscillation frequency of the welding wire within the clearance zone.

19. The welding torch of claim 15, wherein the actuator is a motor configured to apply the force directly to the welding wire within the clearance zone.

20. The welding torch of claim 15, wherein the clearance zone comprises a guide configured to restrict movement of welding wire within the clearance zone to a single plane.

* * * * *